US008309009B2

(12) United States Patent
Fingerhut (10) Patent No.: US 8,309,009 B2
(45) Date of Patent: Nov. 13, 2012

(54) THERMOPLASTICS FORMING PROCESS FOR MOLDING ARTICLES WITH COMPLEX SHAPES

(75) Inventor: Richard L. Fingerhut, Tarzana, CA (US)

(73) Assignee: International Composites Technologies, Inc., Compton, CA (US)

( * ) Notice: Subject to any disclaimer, the term of this patent is extended or adjusted under 35 U.S.C. 154(b) by 271 days.

(21) Appl. No.: 12/645,352

(22) Filed: Dec. 22, 2009

(65) Prior Publication Data
US 2011/0147995 A1    Jun. 23, 2011

(51) Int. Cl.
*B29C 51/08* (2006.01)
(52) U.S. Cl. ......... 264/322; 425/413; 425/352; 425/253
(58) Field of Classification Search ............... 425/324.1, 425/413, 352, 253; 264/322
See application file for complete search history.

(56) References Cited

U.S. PATENT DOCUMENTS

| | | | |
|---|---|---|---|
| 3,208,255 A | 9/1965 | Burk | |
| 3,986,808 A | 10/1976 | Keith | |
| 4,225,553 A * | 9/1980 | Hirota et al. | 264/292 |
| 4,457,797 A | 7/1984 | Hatchadoorian et al. | |
| 4,883,633 A | 11/1989 | French | |
| 5,961,914 A * | 10/1999 | Mannion et al. | 264/544 |
| 6,094,890 A | 8/2000 | Michellon et al. | |
| 6,202,998 B1 | 3/2001 | Gupte | |
| 6,631,630 B1 | 10/2003 | Pourboghrat et al. | |
| 6,896,506 B1 | 5/2005 | Jordan | |
| 7,275,781 B2 | 10/2007 | Wakefield | |
| 7,393,202 B1 | 7/2008 | Slutsky et al. | |
| 2005/0194719 A1* | 9/2005 | Jordan | 264/322 |
| 2008/0175941 A1* | 7/2008 | Slutsky et al. | 425/253 |
| 2008/0265464 A1* | 10/2008 | D'Hooghe et al. | 264/322 |

* cited by examiner

*Primary Examiner* — Joseph Del Sole
*Assistant Examiner* — Kimberly A Stewart
(74) *Attorney, Agent, or Firm* — Fulwider Patton LLP (57) ABSTRACT

The method and system for rapid press forming and consolidation of a sheet of thermoformable material provides for molding of articles with complex shapes. The sheet of thermoformable material is suspended on a movable frame and transferred on a track to a preheating and preconsolidation station, where it is heated, and rapidly transferred suspended on the movable frame via the track to a molding and consolidation station for rapid press forming and consolidation with a hydraulic punch that applies pressure uniformly in all directions, to substantially eliminate wrinkles in the formed product.

23 Claims, 6 Drawing Sheets

THERMOPLASTICS FORMING PROCESS FOR MOLDING ARTICLES WITH COMPLEX SHAPES

BACKGROUND OF THE INVENTION

The present invention is relates generally to a method and system for rapid press forming and consolidation of a sheet of thermoformable material, and more particularly relates to a method and system for rapid press forming and consolidation of a sheet of thermoformable material for molding articles with complex shapes in a manner that applies pressure uniformly in all directions, to substantially eliminate wrinkles in the formed product.

A significant problem in press forming of articles with complex shapes is the formation of wrinkles in the formed product, resulting in considerable waste due to the production of malformed articles, and the need for additional time consuming and laborious steps for final finishing and polishing of the press formed articles to achieve an acceptable final product. One known method of hydroforming of composite materials to shape complex structures to limit wrinkling or rupture of the composite during the shaping process involves providing a press having a fluid chamber defining a cavity for providing pressurized fluid to a surface of a blank, with a blank support for holding the blank having an opening defining a cavity, so that a punch can move through the opening into the fluid chamber.

Another known method provides for fluid forming of oriented thermoplastics from elongated tubular blanks, and involves providing a longitudinally oriented tubular blank formed in a cavity to conform the tubular blank to a predetermined shape of the fluid forming cavity.

Another known technique involves using a punch made of massive rubber, and an apparatus is also known for deforming a sheet of thermoplastic material by sequentially pressing cold tips of projections from a series of moveable combs against first and second faces of a hot sheet of the material.

However, it has been found that none of the foregoing conventional methods of molding articles has been found to be completely satisfactory in eliminating wrinkles in articles formed to have complex shapes. A need therefore remains for a method and system for rapid press forming and consolidation of a sheet of thermoformable material, with an indexed suspension and the film suspension technique, and a hydraulic punch that applies pressure uniformly in all directions, to substantially eliminate wrinkles in the formed product. The present invention meets this and other needs.

SUMMARY OF THE INVENTION

Briefly and in general terms, the present invention provides for a method and system for rapid press forming and consolidation of a sheet of thermoformable material for molding articles with complex shapes, by utilizing uniform preheating of the sheet of thermoformable material, suspending the heated sheet of thermoformable material on a movable frame indexed to transfer the heated sheet of thermoformable material for rapid press forming and consolidation with a hydraulic punch that applies pressure uniformly in all directions, to substantially eliminate wrinkles in the formed product.

Accordingly, the present invention provides for a method and system for rapid press forming and consolidation of a sheet of thermoformable material, utilizing a part-forming hydraulic press having a rapidly movable piston with a punch formed of a deformable elastomeric material. A die mold is provided in opposing relationship with the part-forming hydraulic press configured to receive the punch of the part-forming hydraulic press, and the part-forming hydraulic press and the die mold define a molding and consolidation position between the part-forming hydraulic press and the die mold. A preheating and preconsolidation station is also provided for heating the sheet of thermoformable material. A track extends between the preheating and preconsolidation station and the molding and consolidation position, and a movable frame for holding the sheet of thermoformable material is mounted on the track. The movable frame is indexed to be movable along the track between the preheating and preconsolidation station and the molding and consolidation position.

In a presently preferred aspect, the movable frame includes an inner plate suspended from the interior channel, and the inner plate has an aperture configured to receive at least a portion of a sheet of thermoformable molding composite material. The peripheral edges of the sheet of thermoformable material are removably secured within an interior channel of the movable frame, such as by a retaining strip secured within the interior channel, for example, so as to suspend the sheet of thermoformable material over aperture of the inner plate. The sheet of thermoformable material is heated on the movable frame at the preheating and preconsolidation station, and is then transferred, suspended on the movable frame, to the molding and consolidation position, where the heated sheet of thermoformable material is rapidly punched with the punch of the part-forming hydraulic press, in as little a approximately 3 microseconds, for example, to form a consolidated, molded sheet of thermoformable material. In a presently preferred aspect, the step of rapidly punching the heated sheet of thermoformable material with the punch of the part-forming hydraulic press comprises applying pressure to the heated sheet of thermoformable material uniformly in all directions, to substantially eliminate wrinkles in the formed product. The consolidated, molded sheet of thermoformable material is then released and allowed to cool.

In another presently preferred aspect, the sheet of thermoformable material can be a fiber reinforced thermoplastic, a fiber reinforced thermosetting plastic, or a metal matrix, such as aluminum or silicone carbide-reinforced aluminum, for example, APC-2 PEEK (polyetheretherketone), PEI (polyethylene imine), PPS (polypropylene sulfide), PAS-2 (poly (phenylene sulfide sulfone)), a thermoplastic resin, acrylic prepreg, epoxy and polyester prepreg, nylon, polypropylene, SiCp (silicon carbide particulate)/aluminum metal matrix composites (MMC), polyethylene fiber, thermoplastic aramid, a butyl-backed woven polymer reinforcing fabric, a bidirectional fabric, a braided-slit tape, an interlaced fabric, a powdered towpreg, woven comingled fabric, or a thermoset prepreg, for example.

In another presently preferred aspect, the sheet of thermoformable material can be covered with a film such as nylon, silicone, polyurethane, Kapton, Upilex, polyethylene, aluminum, or combinations thereof, and the film may have a thickness of about 0.5 mil to about 0.050 inch thick, for example. The step of heating the sheet of thermoformable material can be accomplished in an infrared oven, in a convection heater, or using heated platens, for example.

In another presently preferred aspect, the punch can be formed of an elastomeric material such as rubber or polyurethane elastomer, for example. In another presently preferred aspect, the punch can include an outer casing defining an interior chamber mounted to the rapidly movable piston of the part-forming hydraulic press. The outer casing can be formed by a plurality of layers of elastomeric material, such as a tougher outer layer and a softer inner layer, or a softer outer layer and a tougher inner layer, for example. In a presently preferred aspect, the punch is a hydrostatic punch that applies pressure uniformly in all directions, to substantially eliminate wrinkles in the formed product.

These and other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
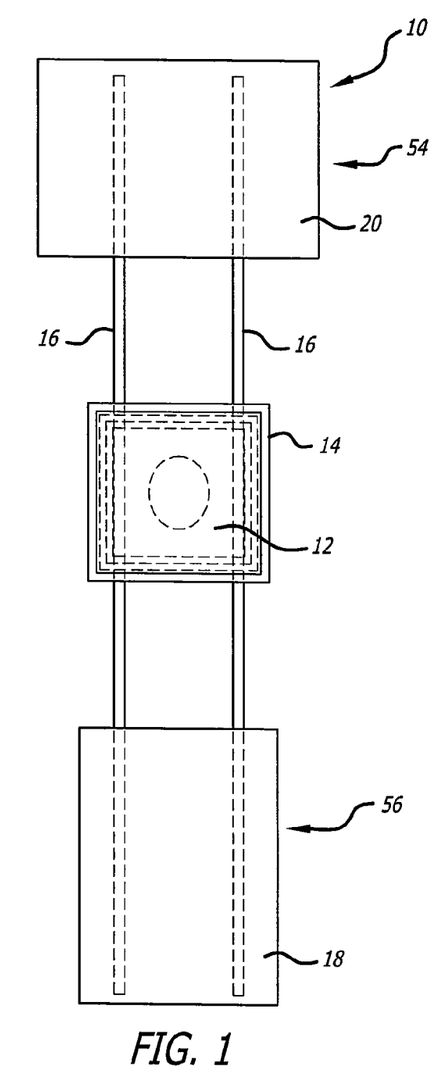
FIG. 1 is a schematic diagram of the system for rapid press forming and consolidation of a sheet of thermoformable material according to the present invention.
Figure 11:
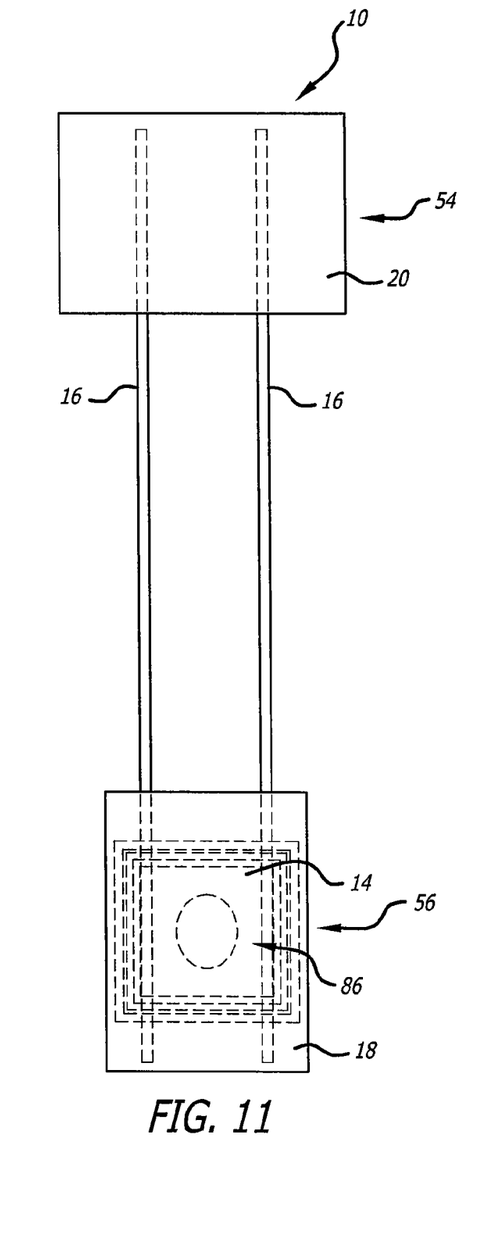
FIG. 11 is a schematic diagram of the system of FIG. 1 illustrating a first indexed position of the movable frame at the preheating and preconsolidation station.
Figure 12:
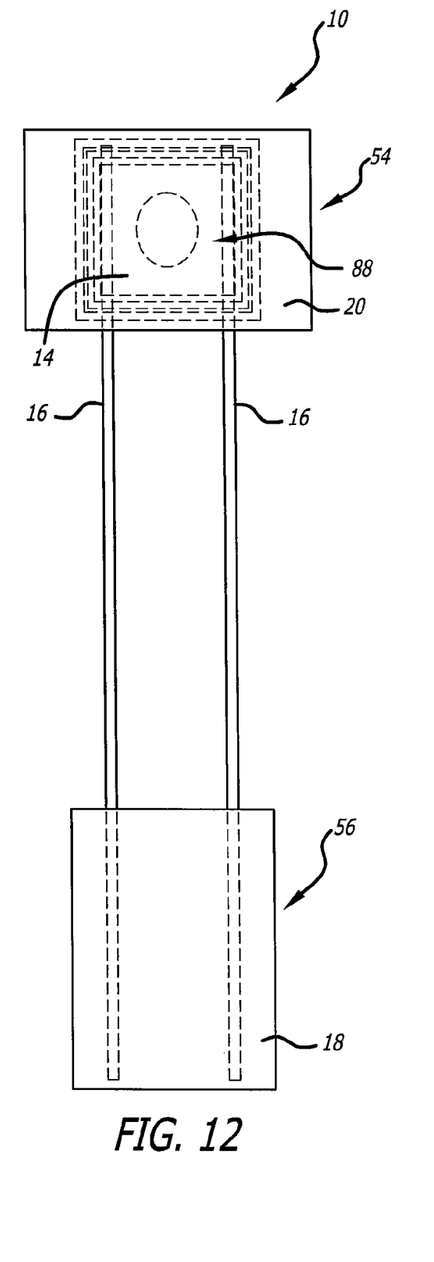
FIG. 12 is a schematic diagram of the system of FIG. 1 illustrating a second indexed position of the movable frame at the molding and consolidation station.

As is illustrated in the drawings, which are provided by way of example and not by way of limitation, the present invention provides for a system 10 for rapid press forming and consolidation of a sheet of thermoformable material 12 which is removably mounted on a form or frame 14, such as a square or rectangular form or frame, for example. The sheet of thermoformable material can be a fiber reinforced thermoplastic, a fiber reinforced thermosetting plastic, or a metal matrix, such as aluminum or silicone carbide-reinforced aluminum, for example, APC-2 PEEK (polyetheretherketone), PEI (polyethylene imine), PPS (polypropylene sulfide), PAS-2 (poly(phenylene sulfide sulfone)), a thermoplastic resin, acrylic prepreg, epoxy and polyester prepreg, nylon, polypropylene, SiCp (silicon carbide particulate)/aluminum metal matrix composites (MMC), polyethylene fiber, thermoplastic aramid, a butyl-backed woven polymer reinforcing fabric, a bidirectional fabric, a braided-slit tape, an interlaced fabric, a powdered towpreg, woven comingled fabric, or a thermoset prepreg, for example. The sheet of thermoformable material optionally also may be covered with a film such as nylon, silicone, polyurethane, Kapton, Upilex, polyethylene, aluminum, or combinations thereof, and the film may have a thickness of about 0.5 mil to about 0.050 inch thick, for example. The membrane or film acts as a release film and carrier, and thermally insulates and supports the molding composite. The form or frame with the sheet of thermoformable material removably mounted on it is rapidly movable on a track 16 that preferably extends between an indexed station in a heater or oven 18 and an indexed station in a part-forming hydraulic press 20, as is illustrated in FIGS. 1, 11 and 12.

Figure 2:
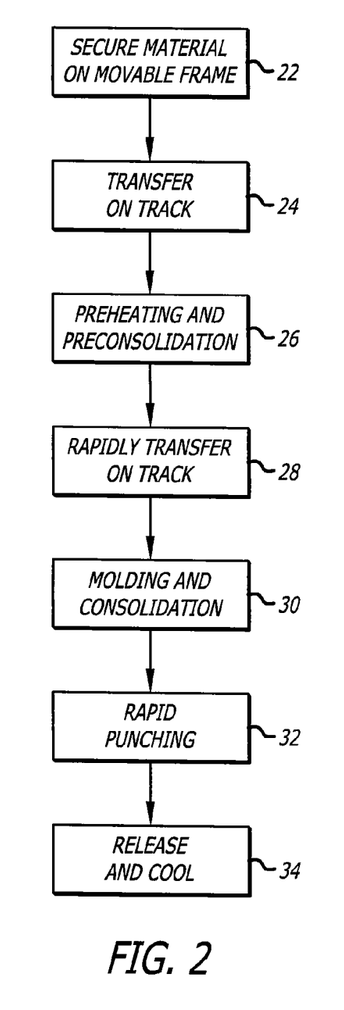
FIG. 2 is a flow chart of the steps of the method for rapid press forming and consolidation of a sheet of thermoformable material according to the present invention.

Referring to FIG. 2, the method of the invention for rapid press forming and consolidation of a sheet of thermoformable material, involves removably securing the peripheral edges of a sheet of thermoformable material within an interior channel of a movable frame so as to suspend the sheet of thermoformable material over an aperture of an inner plate of the frame, as is shown in step 22. In step 24, the sheet of thermoformable material removably secured and suspended on the movable frame is transferred on a track to a preheating and preconsolidation station, and is heated in step 26 at the preheating and preconsolidation station to provide a heated sheet of thermoformable material suspended on said movable frame, typically in approximately 2.5 minutes. The heated sheet of thermoformable material is then rapidly transferred in step 28, suspended on the movable frame, to be placed in the molding and consolidation station between the punch of the part-forming hydraulic press and the die mold in step 30. The heated sheet of thermoformable material is then rapidly punched in step 32 with the punch of the part-forming hydraulic press, by rapidly moving the punch of the part-forming hydraulic press into molding engagement with the die mold, with the heated sheet of thermoformable material therebetween, in as little as approximately 3 microseconds, for example, to form a consolidated, molded sheet of thermoformable material. The punch of the part-forming hydraulic press preferably applies pressure to the heated sheet of thermoformable material uniformly in all directions, to substantially eliminate wrinkles in the formed product. In step 34, the consolidated, molded sheet of thermoformable material is released from between the punch of the part-forming hydraulic press and the die mold, and allowed to cool. In total, the transfer, forming and cool down operation also typically takes approximately 2.5 minutes.

Figure 3:
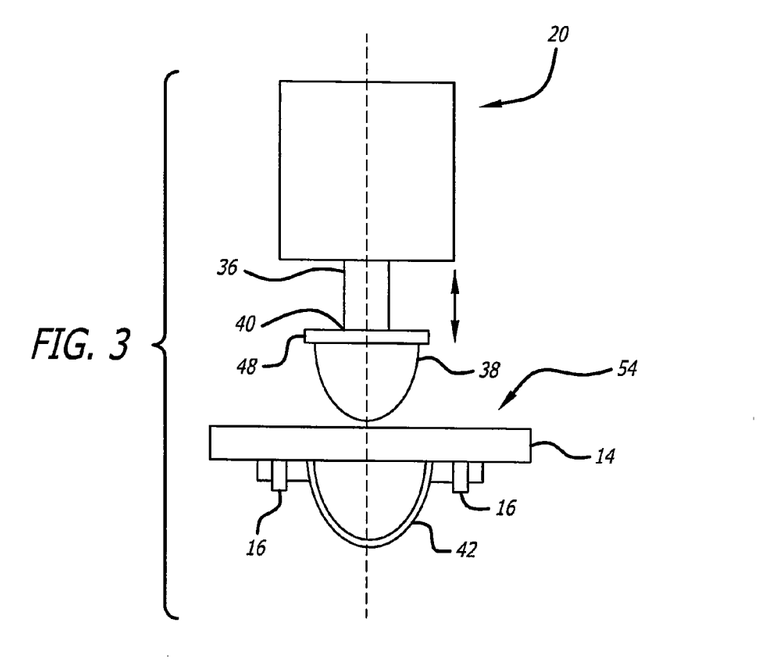
FIG. 3 is a schematic diagram of the part-forming hydraulic press of the system of FIG. 1.

With reference to FIG. 3, the part-forming hydraulic press preferably includes a rapidly movable piston 36 including a punch 38 preferably formed of a deformable elastomeric material affixed at a first end 40 of the movable piston, and a die mold 42 disposed in opposing relationship with the part-forming hydraulic press and configured to receive the punch of the part-forming hydraulic press. The die mold is typically a concave type of mold that can be formed of an elastomeric material, and can have an interior surface coated with or formed of silicone. The punch is typically mostly solid, and can have a metal support, or fluid inside. The punch preferably includes an outer casing 44 formed of an elastomeric material such as rubber or polyurethane elastomer that can be about 3 inches thick, for example. The outer casing of the punch can deform during the thermoforming process in response to stresses in the thermoplastic sheet material to substantially eliminate wrinkles in the finished product. The outer casing of the punch preferably defines an interior chamber 46, that is typically hollow, and may be filled with air or a material such as a fluid or metal, for example, and is mounted to a mounting portion 48 of the piston of the part-forming hydraulic press, which may include an interior metal frame support structure 49 which can be bolted to the mounting portion of the press, and the elastomeric punch head outer casing may be formed over the interior metal frame support structure.

Figure 4:
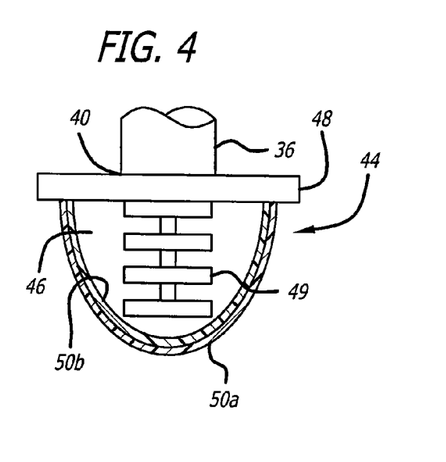
FIG. 4 is a cross-sectional view of a punch of the part-forming hydraulic press of FIG. 3.
Figure 5:
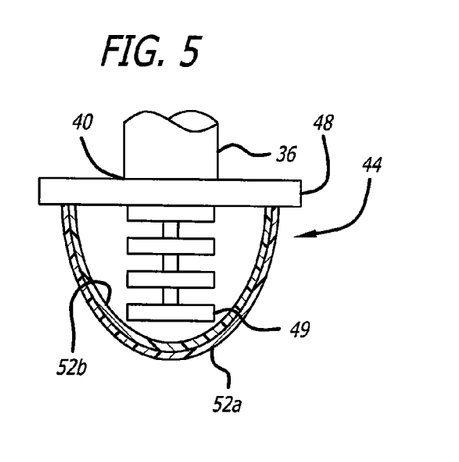
FIG. 5 is a cross-sectional view of a variation of the punch of the part-forming hydraulic press of FIG. 3.

The outer casing of the punch can be formed by a plurality of layers of elastomeric material, such as a tougher outer layer 50a and a softer inner layer 50b, as shown in FIG. 4, although in a variation the outer casing also could alternatively be formed by a plurality of layers of elastomeric material, such as or a softer outer layer 52a and a tougher inner layer 52b, as shown in FIG. 5, for example. In a presently preferred aspect, the punch is a hydrostatic type of punch that applies pressure uniformly in all directions, to substantially eliminate wrinkles in the formed product. In a presently preferred aspect, the elastomeric punch is formed as an exterior convex mold, is durable, and will deform in response to sideward pressures as well as downward or reactive pressures due to forces exerted by the punch, which typically moves very fast, and typically completes a punch on the thermoplastic material in approximately 3 microseconds, for example.

Figure 6:
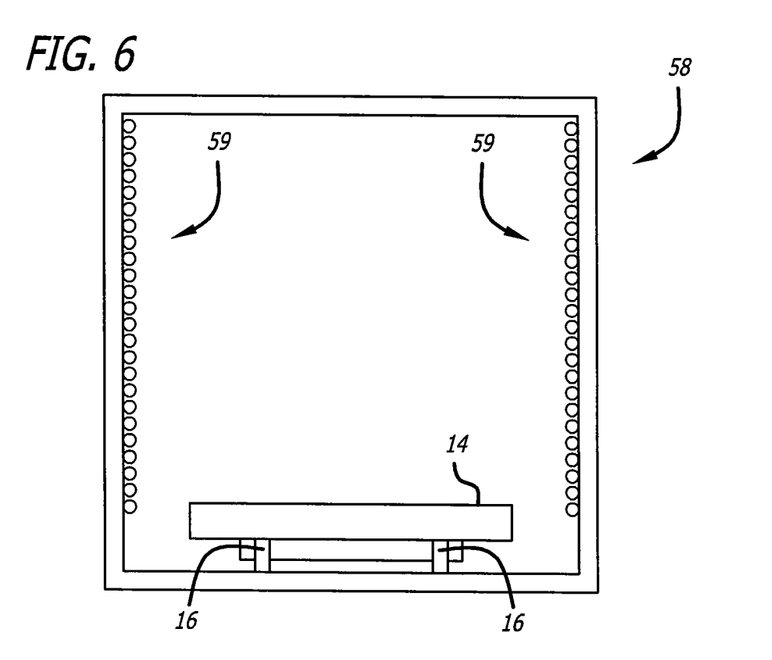
FIG. 6 is a schematic diagram of a radiant infrared (IR) heater or oven of the system of FIG. 1.
Figure 7:
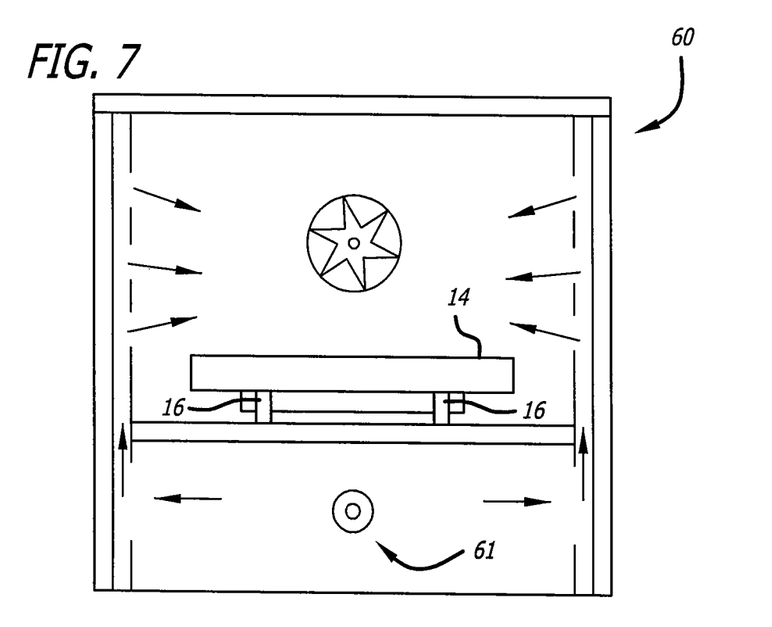
FIG. 7 is a schematic diagram of a convection type heater or oven for the system of FIG. 1.
Figure 8:
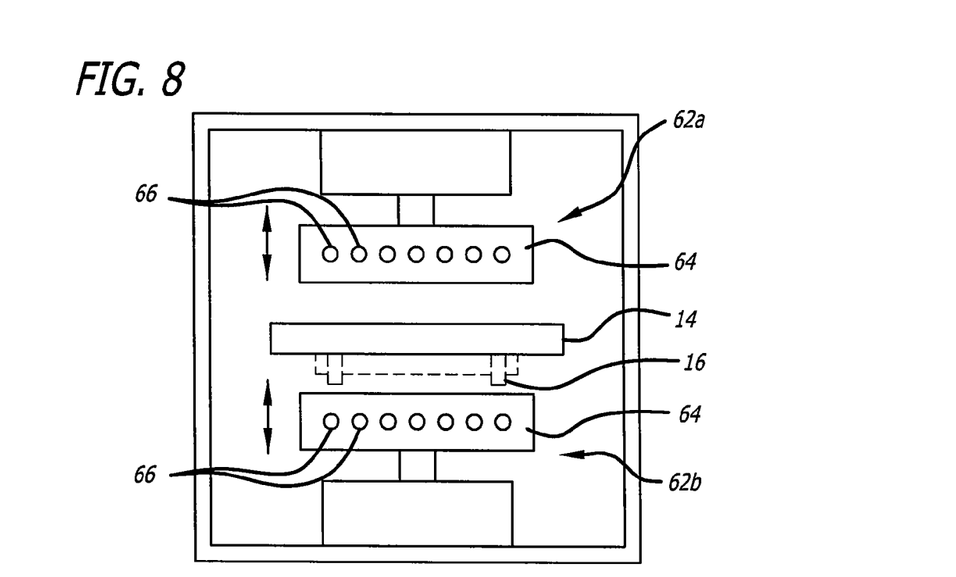
FIG. 8 is a schematic diagram of a platen type heater for the system of FIG. 1.

The part-forming hydraulic press and the die mold define a molding and consolidation position 54 between the part-forming hydraulic press and the die mold, and the heater or oven defines a preheating and preconsolidation station 56 for heating the sheet of thermoformable material. Referring to FIG. 6, in a presently preferred aspect, the preheating and preconsolidation station can include an infrared oven 58, such as a radiant infrared (IR) heater or oven, with electric heating coils 59, for example. Other types of heaters or ovens may also be suitable, such as a convection heater 60 illustrated in FIG. 7, typically providing a flow of heated air heated such as by a gas burner 61, for example, or a platen type heater illustrated in FIG. 8, including heated platens 62a, 62b, typically of type formed of large steel plates 64 and typically containing electrical cartridge heaters 66, and applied with pressure against the material to be heated, for example. The heater or oven provides for single-step heating and consolidation in 2½ to 5 minutes, with heating temperature uniformity to within approximately ±2° C. of a desired molding and consolidation temperature of the thermoformable material.

Figure 9:
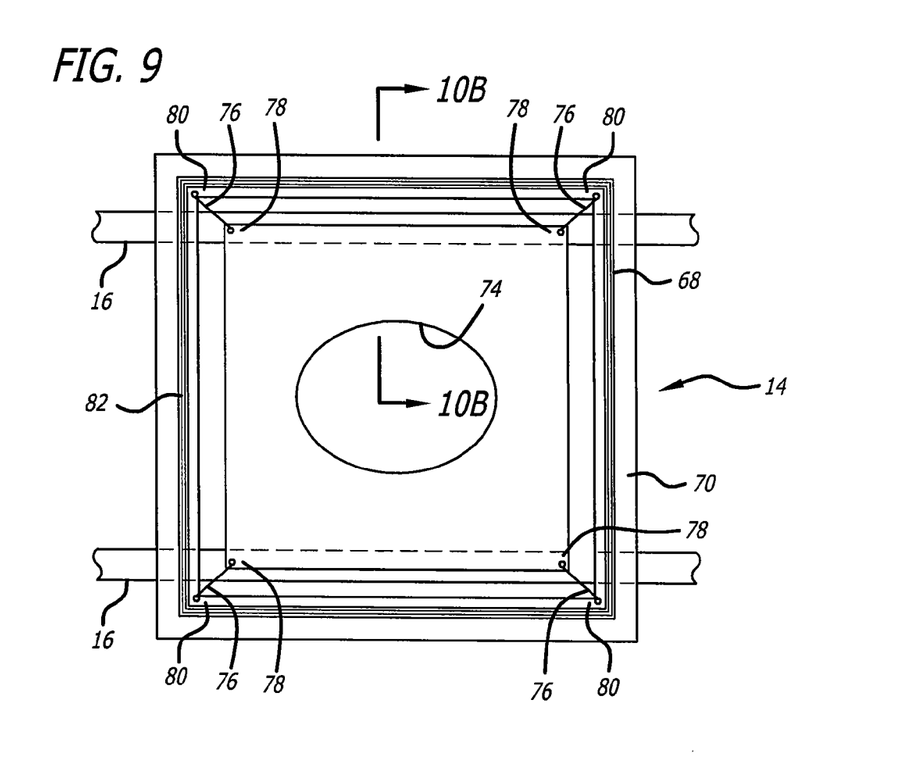
FIG. 9 is a top plan view of the movable frame of the system of FIG. 1.
Figure 10A:
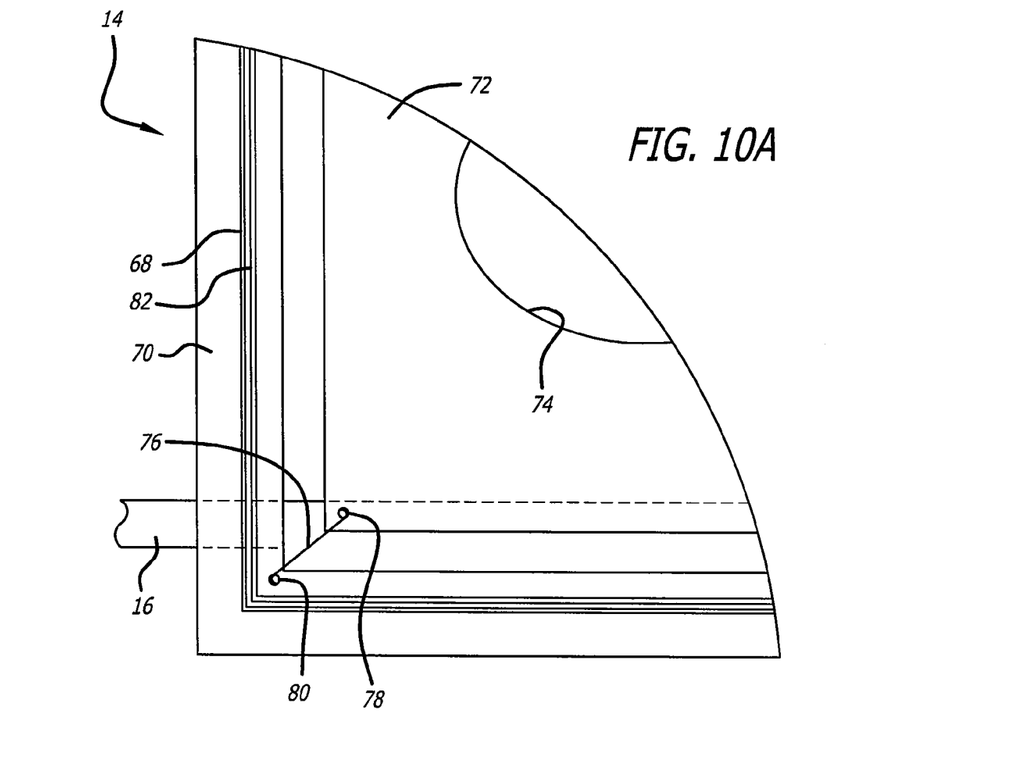
FIG. 10A is an enlarged view of a portion of the movable frame of FIG. 9.
Figure 10B:
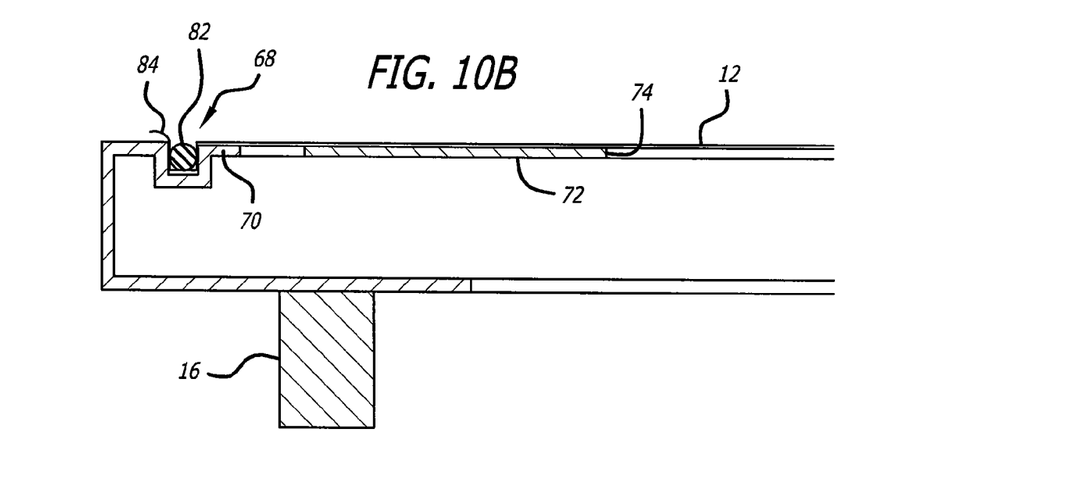
FIG. 10B is a partial sectional view of a portion of the movable frame taken along line 10B-10B of FIG. 9.

With reference to FIGS. 9, 10A and 10B, the movable frame mounted on the track preferably includes an interior channel 68 formed around the perimeter 70 of the frame. An inner plate 72, typically having a rectangular or square configuration, includes a centrally located aperture 74, typically of an oval or circular shape, for example, or as desired for the complex shape to be formed, and is suspended from the interior channel by means 76 for suspending the inner plate, which can be a plurality of resilient devices or elastic members, such as heat resistant elastomeric members or tension springs, for example, connected between the exterior corners 78 of the inner plate and interior corners 80 of the perimeter of the frame. The aperture of the inner plate is configured to receive at least a portion of the sheet of thermoformable material when the sheet of thermoformable material is punched by the punch of the part-forming hydraulic press. A retaining strip 82, typically formed of an elongated heat resistant elastomeric material, is preferably secured within the interior channel, and is configured to removably secure the peripheral edges 84 of the sheet of thermoformable material within the interior channel over the inner plate. The movable frame helps to stabilize the composite sheet material against forming wrinkles for articles being formed with severe contours. Referring to FIGS. 11 and 12, the movable frame is indexed on the track to be movable between a first indexed position 86 at the preheating and preconsolidation station and a second indexed position 88 at the molding and consolidation station between the part-forming hydraulic press and the die mold.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. A method for rapid press forming and consolidation of a sheet of thermoformable material having peripheral edges, comprising the steps of:

providing a part-forming hydraulic press having a rapidly movable piston with a punch affixed at one end of the rapidly movable piston, said punch being formed of a deformable elastomeric material;

providing a die mold in opposing relationship with said part-forming hydraulic press configured to receive said punch of said part-forming hydraulic press, said part-forming hydraulic press and said die mold defining a molding and consolidation position between said part-forming hydraulic press and said die mold;

providing a sheet of thermoformable material having peripheral edges;

providing a preheating and preconsolidation station for heating said sheet of thermoformable material;

providing a track extending between said preheating and preconsolidation station and said molding and consolidation position between said punch of said part-forming hydraulic press and said die mold;

providing a movable frame having an interior channel formed around a perimeter of the movable frame, the movable frame being mounted on said track, and said movable frame being indexed to be movable along said track between a preheating and preconsolidation station and a molding and consolidation position between said punch of said part-forming hydraulic press and said die mold, the movable frame including an inner plate suspended from the interior channel, and the inner plate having an aperture configured to receive at least a portion of a sheet of thermoformable molding composite material;

removably securing the peripheral edges of the sheet of thermoformable material within the interior channel to suspend the sheet of thermoformable material over said aperture of said inner plate;

heating the sheet of thermoformable material on said movable frame at said preheating and preconsolidation station to provide a heated sheet of thermoformable material suspended on said movable frame;

transferring the heated sheet of thermoformable material suspended on said movable frame to said molding and consolidation position between said punch of said part-forming hydraulic press and said die mold;

rapidly punching the heated sheet of thermoformable material with said punch of said part-forming hydraulic press by moving said punch of said part-forming hydraulic press into said molding engagement with said die mold with said heated sheet of thermoformable material therebetween to form a consolidated, molded sheet of thermoformable material;

releasing said consolidated, molded sheet of thermoformable material from between said punch of said part-forming hydraulic press and said die mold; and allowing said consolidated, molded sheet of thermoformable material to cool.

2. The method of claim 1, wherein said step of removably securing the peripheral edges of the sheet of thermoformable material within the interior channel over said inner plate comprises providing a retaining strip secured within the interior channel configured to removably secure the peripheral edges of the sheet of thermoformable material within the interior channel over said inner plate.

3. The method of claim 1, wherein said sheet of thermoformable material is selected from the group consisting of a fiber reinforced thermoplastic, a fiber reinforced thermosetting plastic, and a metal matrix.

4. The method of claim 3, wherein said metal matrix is selected from the group consisting of aluminum and silicon carbide-reinforced aluminum.

5. The method of claim 1, wherein said sheet of thermoformable material is selected from the group consisting of APC-2 PEEK (polyetheretherketone), PEI (polyethylene imine), PPS (polypropylene sulfide), PAS-2 (poly(phenylene sulfide sulfone)), a thermoplastic resin, acrylic prepreg, epoxy and polyester prepreg, nylon, polypropylene, SiCp (silicon carbide particulate)/aluminum metal matrix composites (MMC), polyethylene fiber, and thermoplastic aramid.

6. The method of claim 1, wherein said sheet of thermoformable material is selected from the group consisting of a butyl-backed woven polymer reinforcing fabric, a bidirectional fabric, braided-slit tape, interlaced fabric, powdered towpreg, woven commingled fabric, and thermoset prepreg.

7. The method of claim 1, wherein said sheet of thermoformable material is covered with a film selected from the group consisting of nylon, silicone, polyurethane, Kapton, Upilex, polyethylene, aluminum, and combinations thereof, said film having a thickness of about 0.5 mil to about 0.050 inch thick.

8. The method of claim 1, wherein said step of heating the sheet of thermoformable material comprises heating said sheet of thermoformable material in an infrared oven.

9. The method of claim 1, wherein said step of heating the sheet of thermoformable material comprises heating said sheet of thermoformable material in a convection heater.

10. The method of claim 1, wherein said step of heating the sheet of thermoformable material comprises heating said sheet of thermoformable material between heated platens.

11. The method of claim 1, wherein said step of transferring the heated sheet of thermoformable material to said molding and consolidation position comprises moving said movable frame on said track from said preheating and preconsolidation station to said molding and consolidation position.

12. The method of claim 1, wherein said step of rapidly punching the heated sheet of thermoformable material with said punch of said part-forming hydraulic press comprises completing punching of the heated sheet of thermoformable material in approximately 3 microseconds.

13. The method of claim 1, wherein said step of rapidly punching the heated sheet of thermoformable material with said punch of said part-forming hydraulic press comprises applying pressure to said heated sheet of thermoformable material uniformly in all directions, to substantially eliminate wrinkles in the formed product.

14. A system for rapid forming a sheet of thermoformable material having peripheral edges, the system comprising:

a part-forming hydraulic press having a rapidly movable piston with a punch affixed at one end of the rapidly movable piston, said punch being formed of a deformable elastomeric material;

a die mold disposed in opposing relationship with said part-forming hydraulic press and configured to receive said punch of said part-forming hydraulic press, said part-forming hydraulic press and said die mold defining a molding and consolidation position between said part-forming hydraulic press and said die mold;

a preheating and preconsolidation station for heating the sheet of thermoformable material;

a track extending between said preheating and preconsolidation station and said molding and consolidation position between said part-forming hydraulic press and said die mold;

a movable frame having an interior channel formed around the perimeter of the frame, the movable frame being mounted on said track, said movable frame being indexed on said track to be movable between said preheating and preconsolidation station and said molding and consolidation position between said part-forming hydraulic press and said die mold, said movable frame including an inner plate suspended from the interior channel, the inner plate having an aperture configured to receive at least a portion of the sheet of thermoformable material when said sheet of thermoformable material is punched by the punch of the part-forming hydraulic press, and a retaining strip secured within the interior channel configured to removably secure the peripheral edges of the sheet of thermoformable material within the interior channel over said inner plate.

15. The system of claim 14, wherein said punch comprises an elastomeric material selected from the group consisting of rubber and a polyurethane elastomer.

16. The system of claim 14, wherein said punch comprises an outer casing defining an interior chamber mounted to said rapidly movable piston of said part-forming hydraulic press.

17. The system of claim 14, wherein said punch comprises a hydrostatic punch that applies pressure uniformly in all directions, to substantially eliminate wrinkles in the formed product.

18. The system of claim 16, wherein said outer casing of said punch comprises a plurality of layers of elastomeric material.

19. The system of claim 18, wherein said plurality of layers of elastomeric material comprises a tougher outer layer and a softer inner layer.

20. The system of claim 18, wherein said plurality of layers of elastomeric material comprises a softer outer layer and a tougher inner layer.

21. The system of claim 14, wherein said preheating and preconsolidation station comprises an infrared oven.

22. The system of claim 14, wherein said preheating and preconsolidation station comprises a convection heater.

23. The system of claim 14, wherein said preheating and preconsolidation station comprises heated platens.

* * * * *